US009241289B1

(12) United States Patent
Oroskar et al.

(10) Patent No.: US 9,241,289 B1
(45) Date of Patent: Jan. 19, 2016

(54) DYNAMIC ADJUSTMENT OF CELL RESELECTION PARAMETERS FOR A WIRELESS COMMUNICATION DEVICE

(71) Applicant: Sprint Communications Company L.P., Overland Park, KS (US)

(72) Inventors: Siddharth Oroskar, Overland Park, KS (US); Ryan P. Dreiling, Lenexa, KS (US); Maulik K. Shah, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 266 days.

(21) Appl. No.: 14/061,049

(22) Filed: Oct. 23, 2013

(51) Int. Cl.
*H04W 36/24* (2009.01)
*H04W 36/30* (2009.01)
*H04W 36/36* (2009.01)
*H04W 56/00* (2009.01)
*H04W 76/00* (2009.01)
*H04W 36/00* (2009.01)

(52) U.S. Cl.
CPC ...... *H04W 36/0072* (2013.01); *H04W 36/0094* (2013.01)

(58) Field of Classification Search
CPC ............ H04W 36/00; H04W 36/0055; H04W 36/0061; H04W 36/0083; H04W 36/0094; H04W 36/04; H04W 36/08; H04W 36/24; H04W 36/30; H04W 36/34; H04W 74/0833; H04W 74/0891; H04W 74/002; H04W 74/004; H04W 56/00; H04W 56/0005
See application file for complete search history.

(56) References Cited

U.S. PATENT DOCUMENTS

| 7,957,298 | B2 | 6/2011 | Yi et al. | |
|---|---|---|---|---|
| 8,270,988 | B1 * | 9/2012 | Sarkar | H04W 16/04 370/331 |
| 8,594,674 | B2 * | 11/2013 | Jung | H04W 36/0083 455/115.2 |
| 8,600,388 | B2 * | 12/2013 | Magadi Rangaiah | H04W 36/0061 370/328 |
| 2008/0220784 | A1 * | 9/2008 | Somasundaram | H04W 36/0083 455/437 |
| 2008/0261600 | A1 | 10/2008 | Somasundaram et al. | |
| 2009/0316586 | A1 | 12/2009 | Yi et al. | |
| 2010/0222060 | A1 * | 9/2010 | Zhang | H04W 36/30 455/436 |
| 2011/0188422 | A1 | 8/2011 | Ostergaard et al. | |

(Continued)

FOREIGN PATENT DOCUMENTS

| EP | 2140634 | 10/2008 |
|---|---|---|
| EP | 2136599 | 12/2009 |

(Continued)

*Primary Examiner* — Ahmed Elallam

(57) ABSTRACT

A method of operating a wireless communication device to facilitate cell reselection comprises achieving downlink timing synchronization with a cell associated with a wireless access node based on information broadcast by the wireless access node over a synchronization signal, and performing a number of attempts to achieve uplink timing synchronization with the cell, wherein each of the attempts includes transmitting a preamble identifier and waiting to receive a positive acknowledgement. The method further comprises, if the number of attempts to achieve the uplink timing synchronization with the cell exceeds a threshold amount without receiving the positive acknowledgement, applying an offset to cell reselection parameters to generate modified cell reselection parameters, and responsive to the modified cell reselection parameters satisfying cell reselection criteria, performing both intra-frequency and inter-frequency measurements for potential cell reselection and selecting a different cell for potential synchronization based on the intra-frequency and the inter-frequency measurements.

20 Claims, 5 Drawing Sheets

(56) References Cited

U.S. PATENT DOCUMENTS

| | | | |
|---|---|---|---|
| 2011/0205908 A1 | 8/2011 | Yi et al. | |
| 2013/0053093 A1* | 2/2013 | Deivasigamani | H04W 48/20 455/525 |
| 2014/0057632 A1* | 2/2014 | Hole | H04W 48/20 455/436 |
| 2014/0066074 A1* | 3/2014 | Folke | H04W 36/08 455/437 |
| 2014/0192781 A1* | 7/2014 | Teyeb | H04W 36/34 370/331 |
| 2014/0269364 A1* | 9/2014 | Knapp | H04W 84/18 370/252 |
| 2014/0321343 A1* | 10/2014 | Gupta | H04W 36/0066 370/311 |
| 2015/0063193 A1* | 3/2015 | Veerepalli | H04W 48/16 370/312 |
| 2015/0079989 A1* | 3/2015 | Tambaram Kailasam et al. | H04W 36/30 455/436 |
| 2015/0208280 A1* | 7/2015 | Lorca Hernando | H04W 16/08 370/235 |

FOREIGN PATENT DOCUMENTS

| | | |
|---|---|---|
| EP | 2301296 | 1/2010 |
| EP | 2519052 | 10/2012 |
| WO | 2008131401 | 10/2008 |
| WO | 2010002307 | 1/2010 |

* cited by examiner

DYNAMIC ADJUSTMENT OF CELL RESELECTION PARAMETERS FOR A WIRELESS COMMUNICATION DEVICE

TECHNICAL BACKGROUND

Wireless communication devices transmit and receive information wirelessly via a wireless access node to communicate over a communication network. Typically, the wireless access node is part of a radio access network (RAN) which provides the wireless communication devices with access to further communication networks, systems, and devices. The wireless communication devices utilize "forward link" or "downlink" communication channels to receive voice and/or data transmitted from the wireless access node, and "reverse link" or "uplink" communication channels to transmit information up to the node.

In fourth generation (4G) long term evolution (LTE) communication systems, a wireless communication device is referred to as user equipment (UE), while a wireless access node is called an enhanced node B (eNodeB). In LTE systems, when the UE is first powered on, the initial connectivity for the UE requires it to synchronize with the network as a first step in gaining access to network resources. The eNodeB continuously broadcasts a primary synchronization signal (PSS) for slot synchronization and a secondary synchronization signal (SSS) for frame synchronization. The eNodeB also periodically transmits data in the form of a master information block (MIB) and several system information blocks (SIBs). Once the UE synchronizes with the network, it receives and processes the MIB from the eNodeB. After processing the MIB, the UE reads the SIB1 and SIB2 information blocks which carry important information for the UE to select a cell.

OVERVIEW

A method of operating a wireless communication device to facilitate cell reselection is disclosed. The method comprises achieving downlink timing synchronization with a cell associated with a wireless access node based on information broadcast by the wireless access node over a synchronization signal. The method further comprises performing a number of attempts to achieve uplink timing synchronization with the cell, wherein each of the attempts includes transmitting a preamble identifier over a random access channel to the wireless access node and waiting a time period to receive a positive acknowledgement. The method further comprises, if the number of attempts to achieve the uplink timing synchronization with the cell exceeds a threshold amount without receiving the positive acknowledgement, applying an offset to cell reselection parameters to generate modified cell reselection parameters. The method further comprises, responsive to the modified cell reselection parameters satisfying cell reselection criteria, performing both intra-frequency and inter-frequency measurements for potential cell reselection. The method further comprises selecting a different cell for potential synchronization based on the intra-frequency and the inter-frequency measurements.

A wireless communication device to facilitate cell reselection comprises a wireless communication transceiver and a processing system. The processing system is configured to achieve downlink timing synchronization with a cell associated with a wireless access node based on information broadcast by the wireless access node over a synchronization signal. The processing system is further configured to perform a number of attempts to achieve uplink timing synchronization with the cell, wherein each of the attempts includes the processing system configured to direct the wireless communication transceiver to transmit a preamble identifier over a random access channel to the wireless access node and wait a time period to receive a positive acknowledgement. The processing system is further configured to, if the number of attempts to achieve the uplink timing synchronization with the cell exceeds a threshold amount without receiving the positive acknowledgement, apply an offset to cell reselection parameters to generate modified cell reselection parameters. The processing system is further configured to, responsive to the modified cell reselection parameters satisfying cell reselection criteria, direct the wireless communication transceiver to perform both intra-frequency and inter-frequency measurements for potential cell reselection. The processing system is further configured to select a different cell for potential synchronization based on the intra-frequency and the inter-frequency measurements.

A computer apparatus to facilitate cell reselection comprises software instructions and at least one non-transitory computer-readable storage medium storing the software instructions. The software instructions are configured, when executed by a wireless communication device, to direct the wireless communication device to achieve downlink timing synchronization with a cell associated with a wireless access node based on information broadcast by the wireless access node over a synchronization signal, perform a number of attempts to achieve uplink timing synchronization with the cell, wherein each of the attempts includes transmitting a preamble identifier over a random access channel to the wireless access node and waiting a time period to receive a positive acknowledgement, and if the number of attempts to achieve the uplink timing synchronization with the cell exceeds a threshold amount without receiving the positive acknowledgement, apply an offset to cell reselection parameters to generate modified cell reselection parameters. The software instructions are further configured to direct the wireless communication device to, responsive to the modified cell reselection parameters satisfying cell reselection criteria, perform both intra-frequency and inter-frequency measurements for potential cell reselection and select a different cell for potential synchronization based on the intra-frequency and the inter-frequency measurements.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
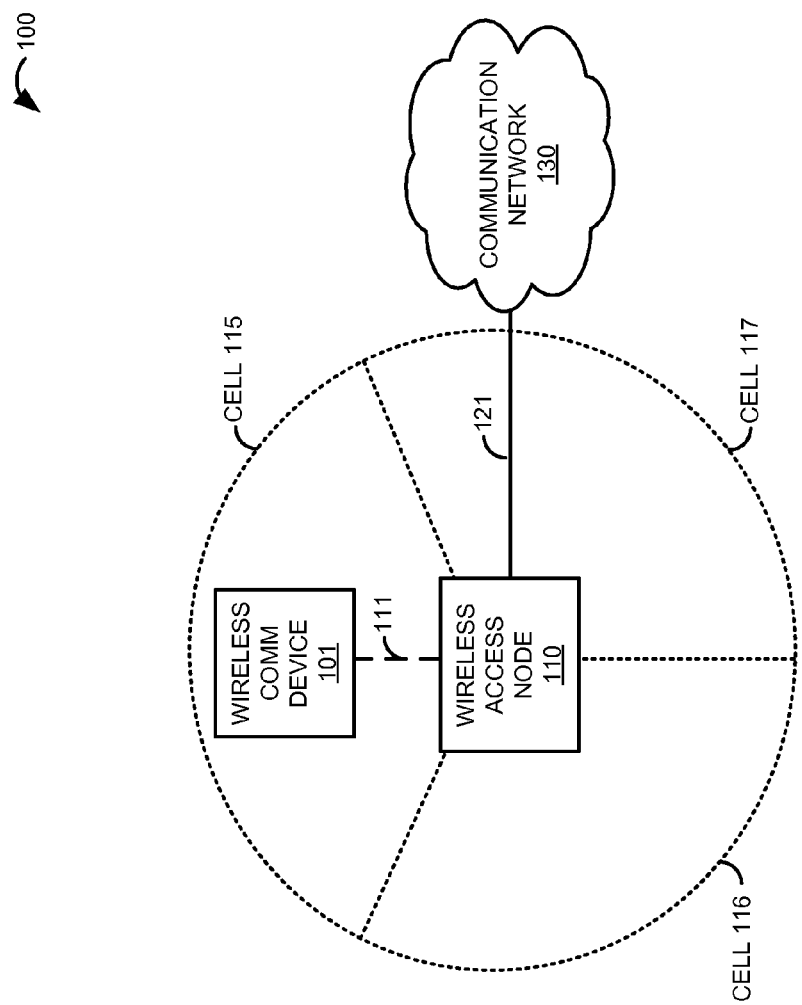
FIG. 1 is a block diagram that illustrates a communication system.

FIG. 1 is a block diagram that illustrates communication system 100. Communication system 100 includes wireless communication device 101, wireless access node 110, and communication network 130. Wireless communication device 101 and wireless access node 110 are in communication over wireless communication link 111. Wireless access node 110 and communication network 130 communicate over communication link 121. In FIG. 1, wireless access node 110 serves cell sectors 115-117. Cells 115-117 shown in FIG. 1 represent geographic areas of signal coverage served by wireless access node 110. As shown in FIG. 1, wireless communication device 101 is presently located in cell sector 115 served by wireless access node 110.

Figure 2:
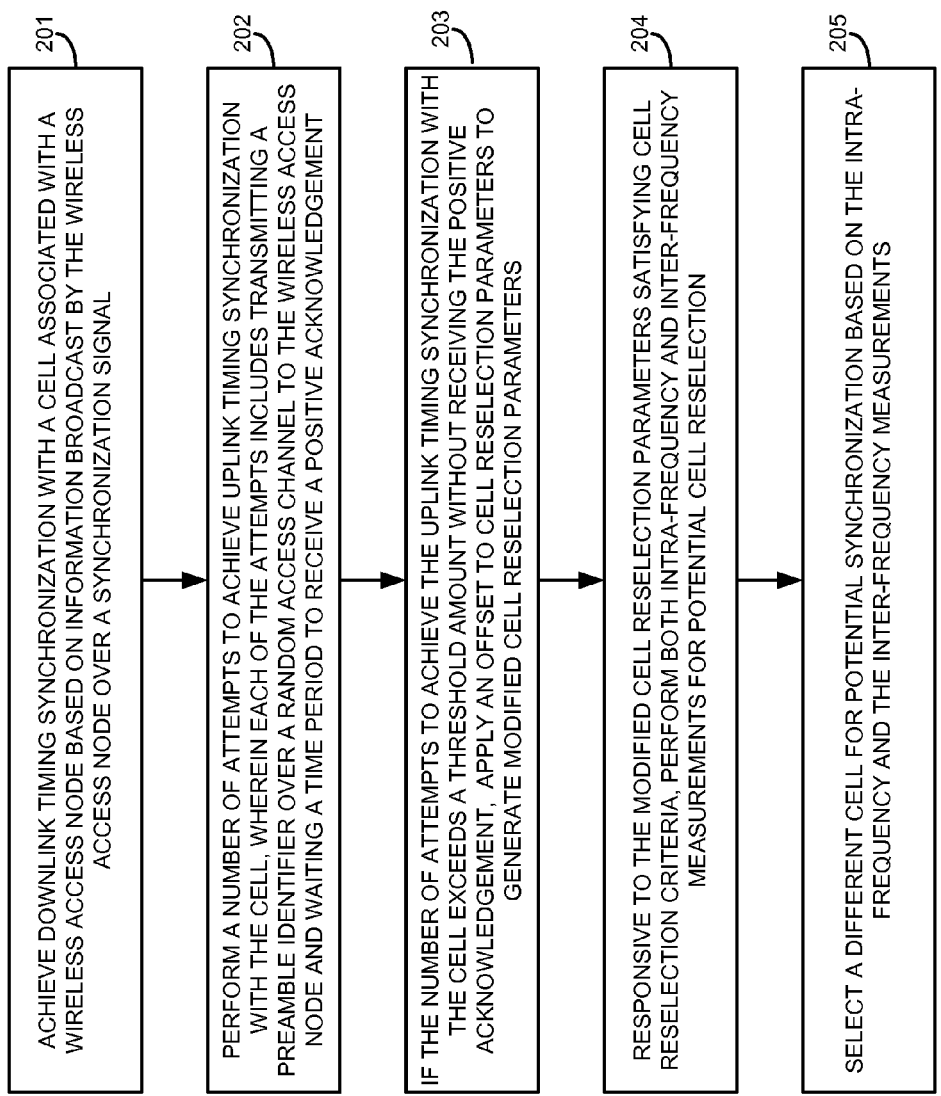
FIG. 2 is a flow diagram that illustrates an operation of the communication system.

FIG. 2 is a flow diagram that illustrates an operation of communication system 100. The steps of the operation are indicated below parenthetically. The operation of communication system 100 shown in FIG. 2 may be employed to facilitate cell reselection for wireless communication device 101.

To begin, wireless communication device 101 achieves downlink timing synchronization with cell 115 associated with wireless access node 110 based on information broadcast by wireless access node 110 over a synchronization signal (201). Typically, wireless access node 110 could transmit information on both a primary and a secondary synchronization signal for slot and frame synchronization, respectively, and wireless communication device 101 could determine the cell identifier of cell 115 from this information in some examples. Wireless communication device 101 may then achieve downlink synchronization timing based on the information received from wireless access node 110 over the synchronization signal. In some examples, wireless access node 110 broadcasts system information, such as channel bandwidth, system frame number, cell identifiers, network capabilities, and other data in the form of a master information block (MIB) and a plurality of system information blocks (SIBs). Wireless communication device 101 may utilize some or all of this information to achieve downlink timing synchronization for camping on cell 115 in some examples.

Wireless communication device 101 then performs a number of attempts to achieve uplink timing synchronization with cell 115, wherein each of the attempts includes transmitting a preamble identifier over a random access channel to wireless access node 110 and waiting a time period to receive a positive acknowledgement (202). Typically, wireless communication device 101 attempts to achieve uplink timing synchronization with cell 115 by carrying out a random access procedure (RAP) using a random access channel (RACH) process. In some examples, wireless communication device 101 indicates its resource requirement to communication network 130 along with transmitting the random access preamble identifier, and device 101 waits for a response from wireless access node 110 in the form of a random access response (RAR). For each attempt to achieve uplink timing synchronization with cell 115, wireless communication device 101 typically waits for a predetermined number of time slots to receive a RAR or some other positive acknowledgement from wireless access node 110. If a positive acknowledgement is not received during the time period that wireless communication device 101 is configured to wait, device 101 may reattempt to achieve uplink timing synchronization with cell 115 by transmitting another preamble identifier, and may increase the power level for each subsequent RACH attempt in some examples.

If the number of attempts to achieve the uplink timing synchronization with cell 115 exceeds a threshold amount without receiving the positive acknowledgement, wireless communication device 101 applies an offset to cell reselection parameters to generate modified cell reselection parameters (203). Typically, the threshold amount may be set to a predetermined value that limits the number of RACH attempts that wireless communication device 101 will make. Once the threshold amount is exceeded without receiving a positive acknowledgement from wireless access node 110, wireless communication device 101 applies an offset to cell reselection parameters to generate modified cell reselection parameters. The offset that wireless communication device 101 applies to the cell reselection parameters may be any positive or negative value, but the modified cell reselection parameters that are generated as a result of applying the offset are typically configured to trigger wireless communication device 101 to perform both intra-frequency and inter-frequency measurements for potential cell reselection. Note that the offset that wireless communication device 101 applies may be different numerical values for different ones of the cell reselection parameters in some examples. The cell reselection parameters could include any attributes that wireless communication device 101 could utilize for cell reselection. For example, the cell reselection parameters could include S_IntraSearch and S_NonIntraSearch parameter values in some examples, and these parameters may be initially received by wireless communication device 101 in a system information block type 3 (SIB-3) message. Other cell reselection parameters are possible and included within the scope of this disclosure.

Responsive to the modified cell reselection parameters satisfying cell reselection criteria, wireless communication device 101 performs both intra-frequency and inter-frequency measurements for potential cell reselection (204). Typically, the cell reselection parameters do not satisfy the cell reselection criteria, but after offsetting the cell reselection parameters, the modified cell reselection parameters will satisfy the cell reselection criteria. This is because the offset is designed to force the cell reselection parameters to satisfy the cell reselection criteria, thereby triggering intra-frequency and inter-frequency search. In some examples, the inter-frequency search could include inter-radio access technology (IRAT) measurements. The cell reselection criteria could include a minimum reference signal receive power (RSRP) level received from cell 115 in some examples. Typically, wireless communication device 101 performs intra-frequency and inter-frequency measurements for its serving cell 115 and other neighboring cells 116 and 117, and then compares and ranks these values to determine cell reselection, although other techniques are possible.

Wireless communication device 101 then selects a different cell 116 or 117 for potential synchronization based on the intra-frequency and the inter-frequency measurements (205). For ease of explanation, this example assumes that cell 116 is selected by wireless communication device 101 as the different cell to try for potential synchronization. Typically, wireless communication device 101 would select the different cell 116 based on cell 116 having the highest RSRP value of all the neighboring cells 115-117 for which intra-frequency and inter-frequency measurements were taken. In some instances, when comparing RSRP values associated with the cell 115 and the different cell 116, wireless communication device 101 may determine that these values are fairly similar, i.e., within a predefined range of each other. Therefore, in some examples, if the RSRP values fall within a predefined range of each other, wireless communication device 101 may perform a first portion of a predefined number of attempts to achieve uplink timing synchronization with cell 115, and if uplink timing synchronization is not achieved with cell 115 during the first portion of the predefined number of attempts, device 101 may perform a second portion of the predefined number of attempts to achieve uplink timing synchronization with the different cell 116.

Advantageously, after a threshold number of failed attempts to achieve uplink timing synchronization with a cell 115, wireless communication device 101 dynamically modifies cell reselection parameters in order to force reselection of a different cell 116. Wireless communication device 101 can then attempt to achieve uplink timing synchronization with the reselected different cell 116 instead of performing repeated attempts that fail to synchronize with the initial cell 115. By dynamically modifying the cell reselection parameters with an offset so that they will satisfy the cell reselection parameters, wireless communication device 101 will originate a preamble on the different cell 116 sooner than it would otherwise, thereby improving the user experience and reducing the burden on network resources.

Referring back to FIG. 1, wireless communication device 101 comprises any device having wireless communication connectivity with hardware and circuitry programmed to function as a telecommunications device, such as Radio Frequency (RF) communication circuitry and an antenna. The RF communication circuitry typically includes an amplifier, filter, modulator, and signal processing circuitry. Wireless communication device 101 may also include a user interface, memory system, software, processing circuitry, or some other communication components. For example, wireless communication device 101 could comprise a telephone, transceiver, mobile phone, cellular phone, smartphone, computer, personal digital assistant (PDA), e-book, game console, mobile Internet device, wireless network interface card, media player, or some other wireless communication apparatus—including combinations thereof. Wireless network protocols that may be utilized by wireless communication device 101 include Code Division Multiple Access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, B, and C, Third Generation Partnership Project Long Term Evolution (3GPP LTE), LTE Advanced, Worldwide Interoperability for Microwave Access (WiMAX), IEEE 802.11 protocols (Wi-Fi), Bluetooth, Internet, telephony, or any other wireless network protocol that facilitates communication between wireless communication device 101 and wireless access node 110.

Wireless access node 110 comprises RF communication circuitry and an antenna. The RF communication circuitry typically includes an amplifier, filter, RF modulator, and signal processing circuitry. Wireless access node 110 may also comprise a router, server, memory device, software, processing circuitry, cabling, power supply, network communication interface, structural support, or some other communication apparatus. Wireless access node 110 could comprise a base station, Internet access node, telephony service node, wireless data access point, or some other wireless communication system—including combinations thereof. Some examples of wireless access node 110 include a base transceiver station (BTS), base station controller (BSC), radio base station (RBS), Node B, enhanced Node B (eNodeB), and others—including combinations thereof. Wireless network protocols that may be utilized by wireless access node 110 include CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format—including combinations thereof.

Cell sectors 115-117 each comprise geographic areas with approximate boundary lines as indicated by the dotted lines on FIG. 1, which are typically defined by the signal propagation characteristics and coverage capabilities of wireless access node 110. Each sector 115-117 represents a different coverage area of wireless access node 110. For example, each sector 115-117 served by wireless access node 110 may be served by separate antennas of wireless access node 110, providing each sector 115-117 a separate direction of tracking and/or different range with respect to the other cell sectors.

Communication network 130 comprises the core network of a wireless communication service provider, and could include routers, gateways, telecommunication switches, servers, processing systems, or other communication equipment and systems for providing communication and data services. Communication network 130 could comprise wireless communication nodes, telephony switches, Internet routers, network gateways, computer systems, communication links, or some other type of communication equipment—including combinations thereof. Communication network 130 may also comprise optical networks, asynchronous transfer mode (ATM) networks, packet networks, radio access networks (RAN), local area networks (LAN), metropolitan area networks (MAN), wide area networks (WAN), or other network topologies, equipment, or systems—including combinations thereof. Communication network 130 may be configured to communicate over metallic, wireless, or optical links—including combinations thereof. Communication network 130 may be configured to use time-division multiplexing (TDM), Internet Protocol (IP), Ethernet, optical networking, wireless protocols, communication signaling, or some other communication format—including combinations thereof. In some examples, communication network 130 includes further access nodes and associated equipment for providing communication services to many wireless communication devices across a large geographic region.

Wireless communication link 111 uses the air or space as the transport medium. Wireless communication link 111 may use various protocols, such as CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format—including combinations thereof. Wireless communication link 111 may comprise many different signals sharing the same link. For example, wireless communication link 111 could include multiple signals operating in a single propagation path comprising multiple communication sessions, frequencies, timeslots, transportation ports, logical transportation links, network sockets, IP sockets, packets, or communication directions—including combinations thereof.

Communication link 121 uses metal, air, space, optical fiber such as glass or plastic, or some other material as the transport medium—including combinations thereof. Communication link 121 could use various communication protocols, such as TDM, IP, Ethernet, telephony, optical networking, hybrid fiber coax (HFC), communication signaling, wireless protocols, or some other communication format—including combinations thereof. Communication link 121 may be a direct link or could include intermediate networks, systems, or devices.

Figure 3:
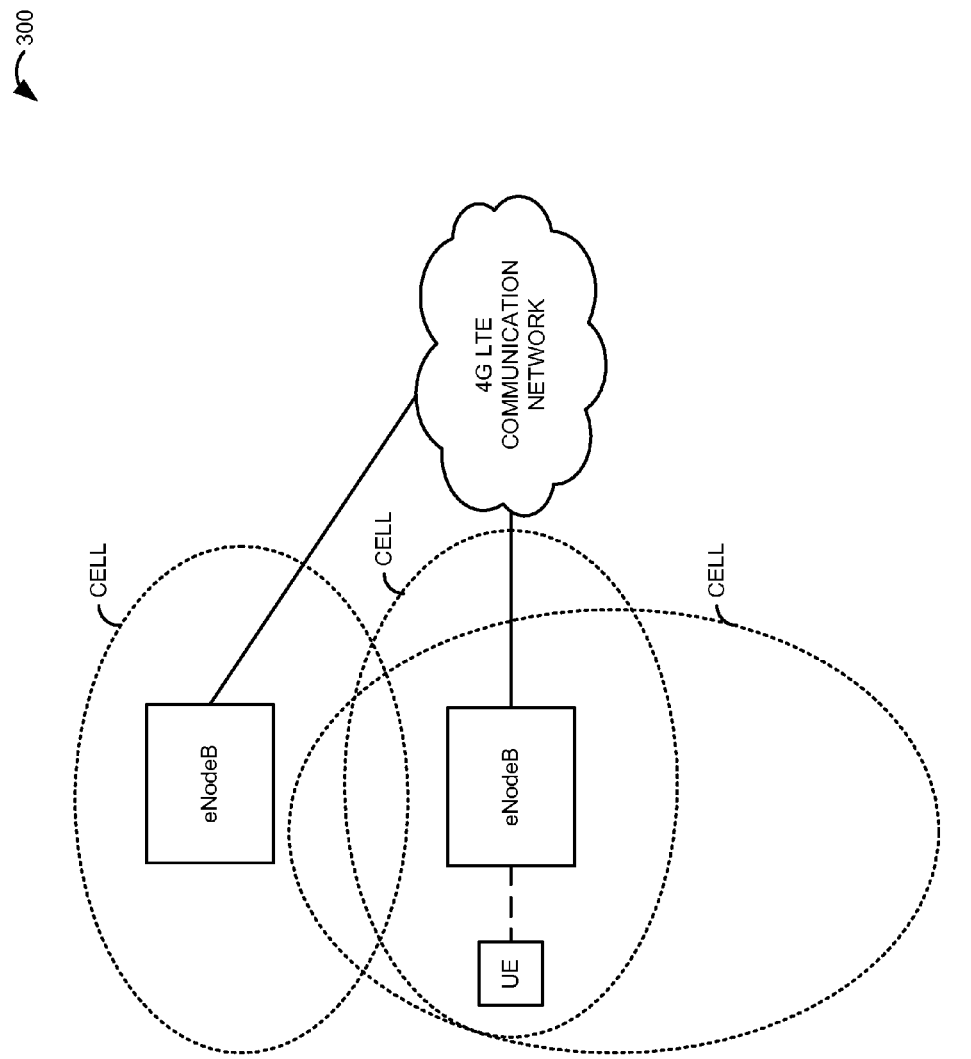
FIG. 3 is a block diagram that illustrates a communication system in an exemplary embodiment.

FIG. 3 is a block diagram that illustrates long term evolution (LTE) communication system 300 in an exemplary embodiment. LTE communication system 300 includes enhanced Node B (eNodeB) base stations that are in communication with the 4G LTE communication network. The eNodeB base stations provide an example of wireless access node 110, although node 110 may use alternative configurations. 4G LTE communication network could include a mobility management entity (MME), serving gateway (SGW), packet data network gateway (PGW), and other network elements typically found in a 4G LTE communication network. Each eNodeB has a wireless coverage area with approximate boundaries as indicated by the dotted line or lines encircling each respective eNodeB, which are typically defined by their signal propagation characteristics and coverage capabilities. LTE communication system 300 also includes a user equipment (UE) device which is shown as being served by one of the eNodeB base stations. The cell surrounding the eNodeB could be referred to as a serving cell for the UE located within it. In this example, the eNodeB serving the UE includes two different cells which partially overlap, as shown by the dotted lines encircling the eNodeB.

In operation, when the UE is first powered on, the initial connectivity for the UE requires it to synchronize with the network as a first step in gaining access to network resources. Initially, the UE has to synchronize with the network at the frame and slot level. The eNodeB continuously broadcasts a primary synchronization signal (PSS) and a secondary synchronization signal (SSS). The PSS is responsible for slot synchronization and the SSS is utilized for frame synchronization, and are typically sent at the last orthogonal frequency-division multiplexing (OFDM) symbol of the first and eleventh slot of each frame. Using both of these signals, the UE can derive the physical cell identifier of the corresponding cell.

The eNodeB also periodically transmits data in the form of a master information block (MIB) and several system information blocks (SIBs). Once the UE synchronizes with the network, it receives and processes the MIB from the eNodeB. The MIB includes system information in the form of a limited number of parameters that are needed by the UE to acquire other information from the cell, including a public land mobile network (PLMN) identifier, tracking area identifier, cell identifier, channel bandwidth, system frame number, physical hybrid automatic repeat request (HARQ) indicator channel (PHICH), and the capabilities of the radio access network and core network.

After processing the MIB, the UE reads the SIB1 and SIB2 information blocks which carry important information for the UE to select a cell. In particular, SIB1 contains parameters related to cell access and the scheduling of other SIBs, while SIB2 includes configurations for common and shared channels, including random access channel (RACH) configurations. The UE receives and processes the information in SIB1 and SIB2 and achieves synchronization with the network in the downlink direction.

In order to synchronize with the network in the uplink direction, the UE initiates a random access procedure (RAP). The UE utilizes the RACH to transmit a message to the network to indicate its resource requirement, and this message also typically includes a preamble identifier. If the eNodeB successfully receives the random access preamble from the UE, it transmits a random access response back and the UE is then able to achieve uplink timing synchronization with the network. However, if use of the RACH is in contention with other UEs, the preamble messages transmitted by the multiple UEs may collide and thus not be received by the eNodeB. In this case, the UE does not receive a response from the eNodeB, and the UE then typically keeps sending additional RACH attempts to the same eNodeB indefinitely until a positive acknowledgement is received.

However, in this example, instead of sending an indefinite amount of RACH attempts, a threshold is set to limit the number of attempts the UE will make. If a positive response is not received from the eNodeB before the threshold number of RACH attempts is reached, the UE applies an offset to the cell reselection parameters s_IntraSearch and s_NonIntraSearch that the UE receives from reading the SIB3 information block. The offset is designed to trigger both intra-frequency as well as inter-frequency/IRAT measurements for potential cell reselection. By applying the offset to force the cell reselection parameters to satisfy the cell reselection criteria, the UE effectively triggers the use of inter-frequency search earlier than it would normally. The inter-frequency search allows the UE to identify a different cell and initiate a preamble on the different cell. The UE may then successfully synchronize with the different cell in the uplink direction. An example of how the intra-frequency and inter-frequency search may be triggered early by adjusting the s_IntraSearch and s_NonIntraSearch parameters will now be described with respect to FIG. 4.

Figure 4:
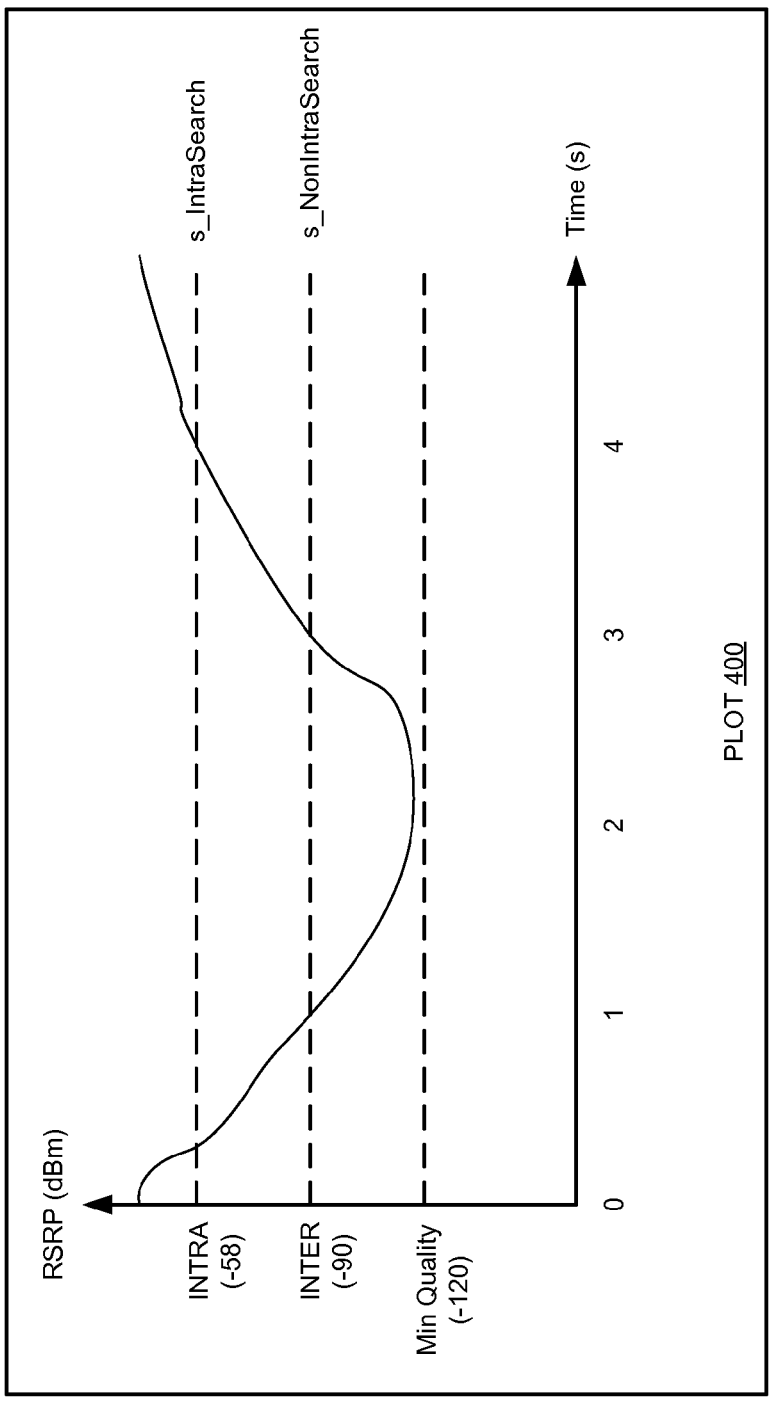
FIG. 4 is a trend diagram that illustrates a plot of reference signal received power over time in an exemplary embodiment.

FIG. 4 is a trend diagram that illustrates a plot 400 of reference signal received power (RSRP) over time in an exemplary embodiment. The y-axis of plot 400 shows RSRP in dBm, which is the power ratio in decibels (dB) of the measured power referenced to one milliwatt. Three different levels of RSRP values are shown by the dashed lines on plot 400, which are provided by the cell reselection parameters in the SIB3 message. In this example, the s_IntraSearch parameter indicates that the UE should initiate intra-frequency search when the RSRP value received from the cell falls below −58 dBm, the s_NonIntraSearch parameter indicates that the UE should initiate inter-frequency search when the RSRP value falls below −90 dBm, and the minimum RSRP quality level is set to −120 dBm.

As shown in plot 400, as time starts elapsing and just after zero seconds, the RSRP value from the cell that the UE is camped on drops below −58 dBm which satisfies the s_IntraSearch parameter and triggers intra-frequency search by the UE. Later, at a time of one second, the UE observes the RSRP value of the cell dropping below the −90 dBm level which satisfies the s_NonIntraSearch parameter, triggering inter-frequency search. During the time of one seconds to three seconds the RSRP value stays below −90 dBm so the UE continues to perform both intra-frequency and inter-frequency measurements. After a time of three seconds, the RSRP value from the cell rises above the −90 dBm threshold, so the UE stops taking inter-frequency measurements. Then, after a time of four seconds, the RSRP value rises above the −58 dBm level so the UE stops taking intra-frequency measurements.

In order to force both intra-frequency and inter-frequency search sooner, the RSRP values for the s_IntraSearch parameter of −58 dBm and the s_NonIntraSearch parameter of −90 dBm could be offset to move up these threshold levels. For example, the s_NonIntraSearch parameter of −90 dBm could be offset to move closer to or even above the −58 dBm level defined by the s_IntraSearch parameter, thereby triggering inter-frequency search sooner than the time of one second that would occur if the offset were not applied. In this manner, the UE will find additional neighboring cells to consider for potential cell reselection. Once the UE measures the serving cell and the neighboring cells, it will rank these cells based in part on the cell reselection timer and Q_hyst, which is the hysteresis value for cell re-selection ranking criteria that is added to the serving cell RSRP measurement. In some examples, an offset may be applied to the Q_hyst value of a neighboring cell so that the neighboring cell is ranked higher than the serving cell and thus selected earlier.

In some examples, if the UE detects a neighboring cell having a comparable RSRP of the serving cell, the UE could split between the two cells the number of RACH attempts allowed for uplink synchronization that is set by the threshold. For example, the UE could read the preamble information from the SIB2 of the neighboring cell having the comparable RSRP of the serving cell and initiate a RACH algorithm wherein an initial set of RACH attempts are sent to the serving cell, and if no positive response is received, the remaining attempts are sent to the neighboring cell. In this manner, the UE will achieve uplink synchronization with a cell faster than using the traditional technique of sending indefinite RACH attempts to the same cell.

Figure 5:
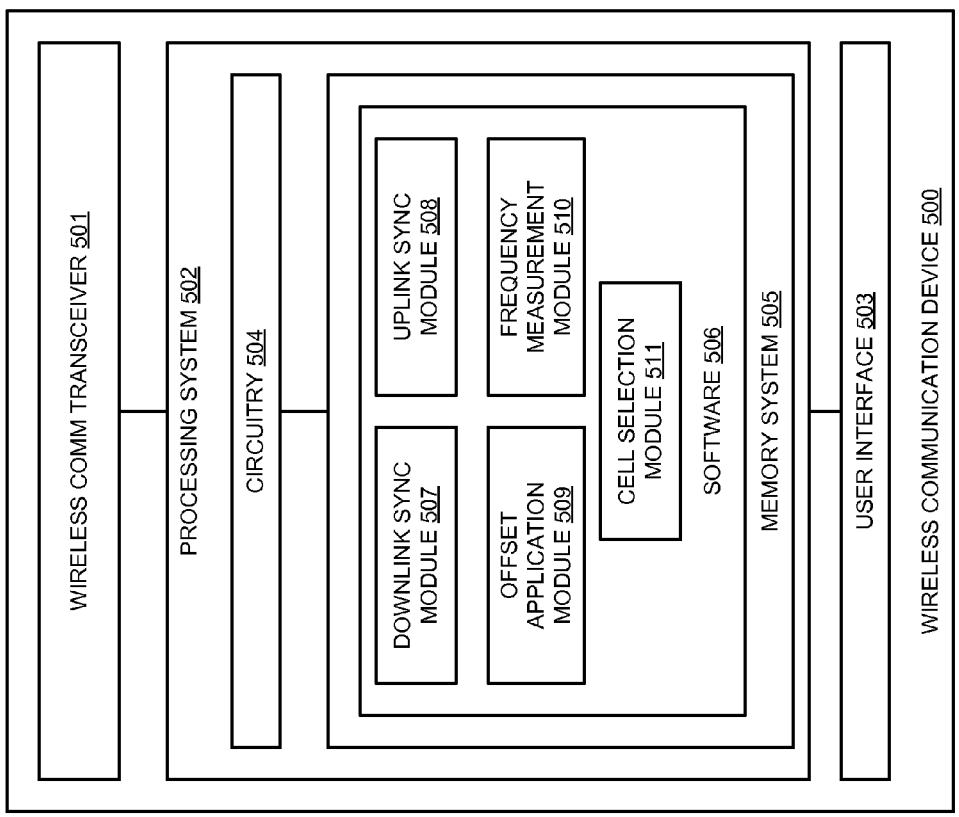
FIG. 5 is a block diagram that illustrates a wireless communication device.

FIG. 5 is a block diagram that illustrates wireless communication device 500. Wireless communication device 500 provides an example of wireless communication device 101, although device 101 could use alternative configurations. Wireless communication device 500 comprises wireless communication transceiver 501, processing system 502, and user interface 503. Processing system 502 is linked to wireless communication transceiver 501 and user interface 503. Processing system 502 includes processing circuitry 504 and memory system 505 that stores operating software 506. Operating software 506 comprises software modules 507-511. Wireless communication device 500 may include other well-known components such as a battery and enclosure that are not shown for clarity. Wireless communication device 500 may comprise a telephone, computer, e-book, mobile Internet appliance, media player, game console, wireless network interface card, or some other wireless communication apparatus—including combinations thereof.

Wireless communication transceiver 501 comprises RF communication circuitry and an antenna. The RF communication circuitry typically includes an amplifier, filter, RF modulator, and signal processing circuitry. Wireless communication transceiver 501 may also include a memory system, software, processing circuitry, or some other communication device. Wireless communication transceiver 501 may use various protocols, such as CDMA, GSM, UMTS, HSPA, EV-DO, EV-DO rev. A, 3GPP LTE, LTE Advanced, WiMAX, Wi-Fi, Bluetooth, Internet, telephony, or some other wireless communication format. Wireless communication transceiver 501 may be configured to achieve downlink timing synchronization with a cell associated with a wireless access node based on information broadcast by the wireless access node over a synchronization signal. Further, wireless communication transceiver 501 may be configured to perform a number of attempts to achieve uplink timing synchronization with the cell, wherein each of the attempts includes transmitting a preamble identifier over a random access channel to the wireless access node and waiting a time period to receive a positive acknowledgement. In addition, wireless communication transceiver 501 may be configured to perform both intra-frequency and inter-frequency measurements for potential cell reselection responsive to modified cell reselection parameters satisfying cell reselection criteria.

User interface 503 comprises components that interact with a user to receive user inputs and to present media and/or information. User interface 503 may include a speaker, microphone, buttons, lights, display screen, touchscreen, touch pad, scroll wheel, communication port, or some other user input/output apparatus—including combinations thereof. User interface 503 may be omitted in some examples.

Processing circuitry 504 comprises microprocessor and other circuitry that retrieves and executes operating software 506 from memory system 505. Processing circuitry 504 may comprise a single device or could be distributed across multiple devices—including devices in different geographic areas. Processing circuitry 504 may be embedded in various types of equipment. Processing circuitry 504 is typically mounted on a circuit board that may also hold memory system 505 and portions of wireless communication transceiver 501 and user interface 503. Memory system 505 comprises a non-transitory computer readable storage medium, such as a disk drive, flash drive, data storage circuitry, or some other hardware memory apparatus. Memory system 505 may comprise a single device or could be distributed across multiple devices—including devices in different geographic areas. Memory system 505 may be embedded in various types of equipment. In some examples, a computer apparatus could comprise memory system 505 and operating software 506. Operating software 506 comprises computer programs, firmware, or some other form of machine-readable processing instructions. Operating software 506 may include an operating system, utilities, drivers, network interfaces, applications, or some other type of software. In this example, operating software 506 comprises software modules 507-511, although software 506 could have alternative configurations in other examples.

When executed by processing circuitry 504, operating software 506 directs processing system 502 to operate wireless communication device 500 as described herein for wireless communication device 101. In particular, operating software 506 directs processing system 502 to achieve downlink timing synchronization with a cell associated with a wireless access node based on information broadcast by the wireless access node over a synchronization signal. Operating software 506 further directs processing system 502 to perform a number of attempts to achieve uplink timing synchronization with the cell, wherein each of the attempts includes processing system 502 configured to direct wireless communication transceiver 501 to transmit a preamble identifier over a random access channel to the wireless access node and wait a time period to receive a positive acknowledgement. In addition, operating software 506 directs processing system 502 to, if the number of attempts to achieve the uplink timing synchronization with the cell exceeds a threshold amount without receiving the positive acknowledgement, apply an offset to cell reselection parameters to generate modified cell reselection parameters. Operating software 506 directs processing system 502 to, responsive to the modified cell reselection parameters satisfying cell reselection criteria, direct wireless communication transceiver 501 to perform both intra-frequency and inter-frequency measurements for potential cell reselection. Finally, operating software 506 directs processing system 502 to select a different cell for potential synchronization based on the intra-frequency and the inter-frequency measurements.

In this example, operating software 506 comprises a downlink synchronization software module 507 that achieves downlink timing synchronization with a cell associated with a wireless access node based on information broadcast by the wireless access node over a synchronization signal. Additionally, operating software 506 comprises an uplink synchronization software module 508 that performs a number of attempts to achieve uplink timing synchronization with the cell, wherein each of the attempts includes transmitting a preamble identifier over a random access channel to the wireless access node and waiting a time period to receive a positive acknowledgement. Operating software 506 also comprises an offset application software module 509 that applies an offset to cell reselection parameters to generate modified cell reselection parameters that if the number of attempts to achieve the uplink timing synchronization with the cell exceeds a threshold amount without receiving the positive acknowledgement. Further, operating software 506 comprises a frequency measurement software module 510 that performs both intra-frequency and inter-frequency measurements for potential cell reselection responsive to the modified cell reselection parameters satisfying cell reselection criteria. Finally, operating software 506 comprises a cell selection software module 511 that selects a different cell for potential synchronization based on the intra-frequency and the inter-frequency measurements.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication device to facilitate cell reselection, the method comprising:
    achieving downlink timing synchronization with a cell associated with a wireless access node based on information broadcast by the wireless access node over a synchronization signal;
    performing a number of attempts to achieve uplink timing synchronization with the cell, wherein each of the attempts includes transmitting a preamble identifier over a random access channel to the wireless access node and waiting a time period to receive a positive acknowledgement;
    if the number of attempts to achieve the uplink timing synchronization with the cell exceeds a threshold amount without receiving the positive acknowledgement, applying an offset to cell reselection parameters to generate modified cell reselection parameters;
    responsive to the modified cell reselection parameters satisfying cell reselection criteria, performing both intra-frequency and inter-frequency measurements for potential cell reselection; and
    selecting a different cell for potential synchronization based on the intra-frequency and the inter-frequency measurements.

2. The method of claim 1 further comprising comparing reference signal receive power (RSRP) values associated with the cell and the different cell.

3. The method of claim 2 further comprising, if the RSRP values fall within a predefined range of each other, performing a first portion of a predefined number of attempts to achieve uplink timing synchronization with the cell, and if uplink timing synchronization is not achieved with the cell during the first portion of the predefined number of attempts, performing a second portion of the predefined number of attempts to achieve uplink timing synchronization with the different cell.

4. The method of claim 1 wherein the cell reselection parameters are included in a system information block type 3 (SIB-3).

5. The method of claim 4 wherein the cell reselection parameters include S_IntraSearch and S_NonIntraSearch parameter values.

6. The method of claim 1 wherein the cell reselection parameters do not satisfy the cell reselection criteria.

7. The method of claim 1 wherein the wireless access node comprises an eNodeB in a long term evolution wireless network.

8. A wireless communication device to facilitate cell reselection, the wireless communication device comprising:
    a wireless communication transceiver; and
    a processing system configured to achieve downlink timing synchronization with a cell associated with a wireless access node based on information broadcast by the wireless access node over a synchronization signal;
    the processing system configured to perform a number of attempts to achieve uplink timing synchronization with the cell, wherein each of the attempts includes the processing system configured to direct the wireless communication transceiver to transmit a preamble identifier over a random access channel to the wireless access node and wait a time period to receive a positive acknowledgement;
    the processing system configured to, if the number of attempts to achieve the uplink timing synchronization with the cell exceeds a threshold amount without receiving the positive acknowledgement, apply an offset to cell reselection parameters to generate modified cell reselection parameters;
    the processing system configured to, responsive to the modified cell reselection parameters satisfying cell reselection criteria, direct the wireless communication transceiver to perform both intra-frequency and inter-frequency measurements for potential cell reselection; and
    the processing system configured to select a different cell for potential synchronization based on the intra-frequency and the inter-frequency measurements.

9. The wireless communication device of claim 8 further comprising the processing system configured to compare reference signal receive power (RSRP) values associated with the cell and the different cell.

10. The wireless communication device of claim 9 further comprising, if the RSRP values fall within a predefined range of each other, the processing system configured to direct the wireless communication transceiver to perform a first portion of a predefined number of attempts to achieve uplink timing synchronization with the cell, and if uplink timing synchronization is not achieved with the cell during the first portion of the predefined number of attempts, the processing system configured to direct the wireless communication transceiver to perform a second portion of the predefined number of attempts to achieve uplink timing synchronization with the different cell.

11. The wireless communication device of claim 8 wherein the cell reselection parameters are included in a system information block type 3 (SIB-3).

12. The wireless communication device of claim 11 wherein the cell reselection parameters include S_IntraSearch and S_NonIntraSearch parameter values.

13. The wireless communication device of claim 8 wherein the cell reselection parameters do not satisfy the cell reselection criteria.

14. The wireless communication device of claim 8 wherein the wireless access node comprises an eNodeB in a long term evolution wireless network.

15. A computer apparatus to facilitate cell reselection, the apparatus comprising:

software instructions configured, when executed by a wireless communication device, to direct the wireless communication device to achieve downlink timing synchronization with a cell associated with a wireless access node based on information broadcast by the wireless access node over a synchronization signal, perform a number of attempts to achieve uplink timing synchronization with the cell, wherein each of the attempts includes transmitting a preamble identifier over a random access channel to the wireless access node and waiting a time period to receive a positive acknowledgement, and if the number of attempts to achieve the uplink timing synchronization with the cell exceeds a threshold amount without receiving the positive acknowledgement, apply an offset to cell reselection parameters to generate modified cell reselection parameters;

the software instructions further configured to direct the wireless communication device to, responsive to the modified cell reselection parameters satisfying cell reselection criteria, perform both intra-frequency and inter-frequency measurements for potential cell reselection and select a different cell for potential synchronization based on the intra-frequency and the inter-frequency measurements; and at least one non-transitory computer-readable storage medium storing the software instructions.

16. The computer apparatus of claim 15 further comprising the software instructions configured to direct the wireless communication device to compare reference signal receive power (RSRP) values associated with the cell and the different cell.

17. The computer apparatus of claim 16 further comprising, if the RSRP values fall within a predefined range of each other, the software instructions are configured to direct the wireless communication device to perform a first portion of a predefined number of attempts to achieve uplink timing synchronization with the cell, and if uplink timing synchronization is not achieved with the cell during the first portion of the predefined number of attempts, perform a second portion of the predefined number of attempts to achieve uplink timing synchronization with the different cell.

18. The computer apparatus of claim 15 wherein the cell reselection parameters are included in a system information block type 3 (SIB-3).

19. The computer apparatus of claim 18 wherein the cell reselection parameters include S_IntraSearch and S_NonIntraSearch parameter values.

20. The computer apparatus of claim 15 wherein the cell reselection parameters do not satisfy the cell reselection criteria.

* * * * *